United States Patent Office 3,097,095
Patented July 9, 1963

3,097,095
MATERIAL FOR ELECTROPHOTOGRAPHIC REPRODUCTION
Kurt-Walter Klüpfel, Hans-Rainer Stumpf, Hans Behmenburg, Wilhelm Neugebauer, Oskar Süs, and Martha Tomanek, all of Wiesbaden-Biebrich, Germany, assignors, by mesne assignments, to Azoplate Corporation, Murray Hill, N.J.
No Drawing. Filed Nov. 20, 1957, Ser. No. 697,533
Claims priority, application Germany Nov. 21, 1956
38 Claims. (Cl. 96—1)

Among modern reproduction processes the electrophotographic process, also known as xerography, is becoming of increasing practical importance. It is a dry process of particular interest in certain fields, for example, office duplicating, and it consists in the application to a material consisting of an electrically conductive support and a photoconductive insulating layer adherent thereto of an electrostatic charge which imparts to the insulating layer the property of light-sensitivity. Such light-sensitive material can be used for the production of images by electrophotographic means. It is exposed to light beneath a master, so that the electrostatic charge is leaked away in the parts of the layer struck by light. The invisible electrostatic image thereby produced is made visible (developed) by powdering over with finely divided, coloured synthetic resin and given permanence (fixed) by the application to the support of heat or of a second electric field.

Known materials used for the preparation of the photoconductive insulating layers required for the aforedescribed process include selenium, sulphur, zinc oxide, and also organic substances such as anthracene or anthraquinone. Consideration has also been given to a method of preparing the photoconductive insulating layers whereby the photoconductive substances in association with bonding agents are dispersed in solvents, applied thus to electrically conductive supports, primarily metal foils, and dried. However, the photoelectrically sensitisable material thus obtained has not yet satisfied the extensive demands made of modern duplicating material in respect of range of use, reliability, simplicity in handling and not least in importance, light-sensitivity and keeping qualities.

It is now found that if as photoconductive substances 4,5-diphenylimidazolidinone-(2) substances or 4,5-diphenylimidazolidinethione-(2) substances corresponding to the general formula

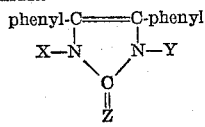

in which X and Y stand for hydrogen, alkyl or phenyl and Z for oxygen or sulfur, are used, unexpectedly successful photoelectrically sensitisable layers with a surprising range of practical applications are produced.

In addition to the substances of the above general formula, to be used as photoconductive materials, in accordance with this invention, there may also be used compounds containing substituted phenyl groups, e.g. phenyl groups substituted by halogen, hydroxyl, primary, secondary or tertiary amino groups, alkyl or alkoxy groups. The presence of strongly negative substituents, e.g. nitro or nitroso groups, disadvantageously affects the suitability of 4,5-diphenyl-imidazolidinone-(2) and 4,5-diphenyl-imidazolidinethione-(2) substances for purposes of this invention or even renders such substances completely unsuitable for such purposes.

Compounds corresponding to the above general formula give very homogeneous coatings with unlimited shelf life; they are colourless and fluoresce in daylight or in ultraviolet light with blue colour.

The 4,5-diphenyl-imidazolidinone-(2) substances or 4,5-dipheny-imidazolidinethione-(2) substances to be used as provided by the invention for the preparation of the photoelectric insulating layers are best used in solution with organic solvents, such as benzene, acetone, methylene chloride, glycolmonomethyl ether etc. Mixtures of several of the above 4,5-diphenyl substances may be used as well as mixtures of the above solvents. It has further been discovered that it is advantageous, in the production of the photoelectric insulating layers, to use organic colloids in association with the 4,5-diphenyl-imidazolidinone-(2) or imidazolidinethione-(2) substance. Such organic colloids include natural and synthetic resins, e.g. balsam resins, phenol resins modified with colophony and other resins of which colophony constitutes the major part, coumarone resins and indene resins and the substances covered by the collective term "synthetic lacquer resins," which according to the Kunststofftaschenbuch (Plastics Pocket Book) published by Saechtling-Zebrowski (11th edition, 1955, page 212 onwards) include processed natural substances such as cellulose ether; polymers such as the polyvinyl chlorides, polyvinyl acetates, polyvinyl acetals, polyvinyl alcohols, polyvinyl ethers, polyacrylic and polymethacrylic esters, as well as polystyrene and isobutylene; polycondensates, e.g. polyesters, such as phthalate resins, alkyd resins, maleate resins, maleic resins, colophony, mixed esters of higher alcohols, phenol-formaldehyde resins, particularly colophony-modified phenol-formaldehyde condensates, urea-formaldehyde resins, melamineformaldehyde condensates, aldehyde resins, ketone resins of which particular mention is to be made of AW 2 resins of the firm Badische Anilin- und Sodafabrik, xylene formaldehyde resins and polyamides; and also polyadducts, such as polyurethane.

If the 4,5-diphenyl-imidazolidinone-(2) and 4,5-diphenyl-imidazolidinethione-(2) compounds are used in association with organic colloids, the proportion of resin to photoconductive substance can vary very greatly. The use of mixtures of approximately equal parts of resin and photoconductive substances has been found advantageous.

The solutions containing the added organic colloid give transparent colourless layers when dried, whereby they may be considered as solid solutions.

The base materials used as electroconductive supports may be any materials that satisfy the requirements of zerography, e.g. metal or glass plates, paper, or plates or foils made of electrically conductive resins or plastic resins. If paper is used as the support for the photoconductive layer, pretreatment of the paper for the photoconductive insulating layers to prevent penetration of the coating solution is advisable. Such pretreatment may be with methyl-cellulose in aqueous solution, or polyvinyl alcohol in aqueous solution, or with a solution in acetone and methylethylketone of a copolymer of acrylic acid methyl ester and acrylonitrile, or with solutions of polyamides in aqueous alcohols. Aqueous dispersions of substances suitable for the pretreatment of the paper surface may also be used.

The solutions of the 4,5-diphenyl-imidazolidinone-(2) and 4,5-diphenyl-imidazolidinethione-(2) substances, with or without the resins are applied to the supports in the usual manner for example by spraying, by direct applications, by fluidized-bed coating, etc., and then dried so as to produce a homogeneous photoconductive layer on the electro-conductive support.

The layers are, in themselves, not light-sensitive. However, after an electrostatic charge has been applied to the layers, i.e. after they have been charged by means of, for example, a corona discharge, the layer becomes light-sensitive and can be used with long-wave U.V. light of 3600–4000 A.U. for electrophotographic image-production. Very short exposure under a master to a high-pressure mercury lamp will give good images.

The layers made according to the present invention have, even when charged, very little sensitivity to the visible range of the spectrum. However, the further discovery has been made that the spectral sensitivity of the photoconductive layer can be extended by means of sensitizers into the visible part of the spectrum.

The most suitable sensitizers are dyestuffs; for their easier identification the number is given under which they are listed in Schultz' "Farbstofftabellen" (7th ed., 1st vol., 1931). The following are given as examples of effective sensitizers: triarylmethane dyestuffs such as brilliant green (No. 760, p. 314), Victoria blue B (No. 822, p. 347), methyl violet (No. 783, p. 327), crystal violet (No. 785, p. 329), acid violet 6B (No. 831, p. 351); xanthene dyestuffs, namely rhodamines, such as rhodamine B (No. 864, p. 365), rhodamine 6G (No. 866, p. 336), rhodamine G extra (No. 865, p. 366), sulphorhodamine B (No. 863, p. 364) and true acid eosin G (No. 870, p. 368), as also phthaleins such as eosin S (No. 883, p. 375), eosin A (No. 881, p. 374), erythrosin (No. 886, p. 376), phloxin (No. 890, p. 378), Rose Bengal (No. 889, p. 378), and fluorescein (No. 880, p. 373); thiazine dyestuffs such as methylene blue (No. 1038, p. 449); acridine dyestuffs such as acridine yellow (No. 901, p. 383), acridine orange (No. 908, p. 387) and trypaflavine (No. 906, p. 386); quinoline dyestuffs such as pinacyanol (No. 924, p. 396) and cryptocyanine (No. 927, p. 397); quinone dyestuffs and ketone dyestuffs such as alizarin (No. 1141, p. 499), alizarin red S (No. 1145, p. 502) and quinizarine (No. 1148, p. 504); cyanine dyestuffs, e.g. cyanine (No. 921, p. 394).

The production of images by electrophotographic means is carried out as follows: When the photoconductive layer has been charged, by means of, for example, a corona discharge with a charging apparatus maintained at 6000 volts, the support, e.g. paper, or aluminum or plastic foil, with the sensitised layer thereon, is exposed to light under a master or by episcopic or diascopic projection and is then dusted over in known manner with a resin powder coloured with carbon black. The image that now becomes visible can, however, easily be wiped off. It therefore must be fixed. It can, for example, be fixed by being heated briefly by means of an infra-red radiator. The temperature required is less if the heat treatment is carried out in the presence of vapours of solvents such as trichlorethylene, carbon tetrachloride or ethyl alcohol. Fixing of the powdered image can also be accomplished by steam. Positive images, characterized by good contrast, are produced from positive masters.

After being fixed these electrophotographic images can be converted into a printing plate: the support, e.g. the paper or plastic foil, is wiped over with a solvent for the photoconductive layer, e.g. alcohol, or acetic acid, and then rinsed with water and inked with greasy ink in known manner. In this way positive printing plates are obtained which can be set up in an offset machine and used for printing. They give very long runs.

If transparent supports are used, the electrophotographic images can also be used as masters for the production of additional copies on any sort of light-sensitive sheets. In this respect, the photoconductive compounds to be used, as provided by the invention, are superior to the substances used hitherto, such as selenium or zinc oxide, inasmuch as the latter give cloudy layers. This is due to the fact that solid solutions cannot be produced with such materials, only suspensions being possible.

If translucent supports are used for the photoconductive layers, such as are provided by the invention, reflex images can also be produced. The possibility of providing such a reflex copy also constitutes an advantage over the known art.

The photoconductive layers prepared in accordance with this invention have a further important advantage in that they can be charged positively as well as negatively. With positive charging, the images are particularly good while evolution of ozone, which is injurious to health, and which occurs to a great extent with negative charging, is negligible.

The following compounds are examples of those substances corresponding to the aforementioned general formula which may be used in this invention:

FORMULA 1

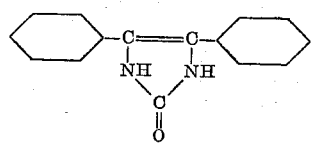

FORMULA 2

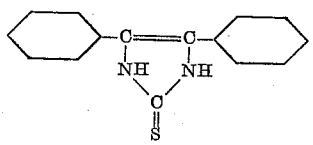

FORMULA 3

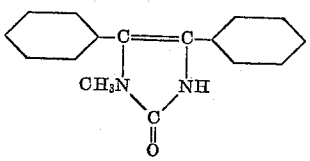

FORMULA 4

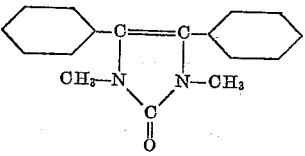

FORMULA 5

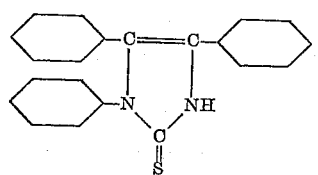

FORMULA 6

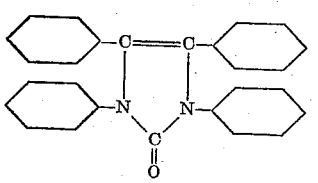

FORMULA 7
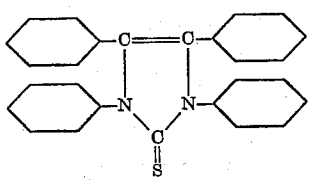
FORMULA 8
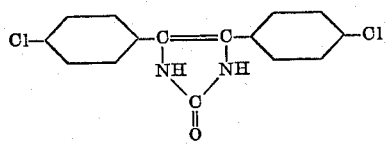
FORMULA 9
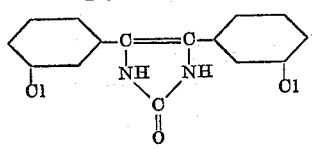
FORMULA 10
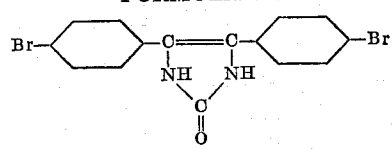
FORMULA 11
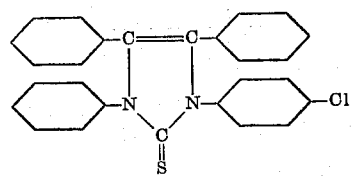
FORMULA 12
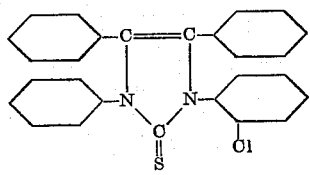
FORMULA 13
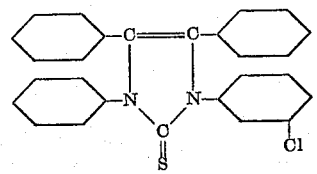
FORMULA 14
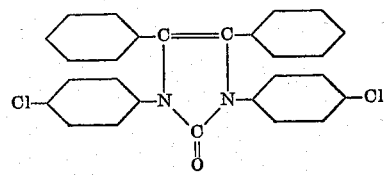
FORMULA 15
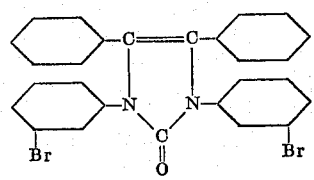
FORMULA 16
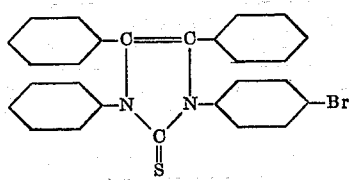
FORMULA 17
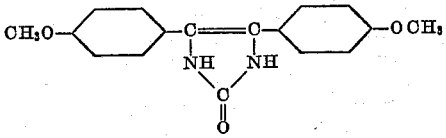
FORMULA 18
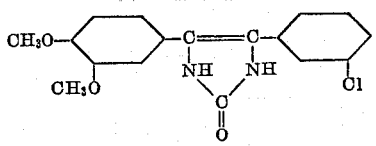
FORMULA 19
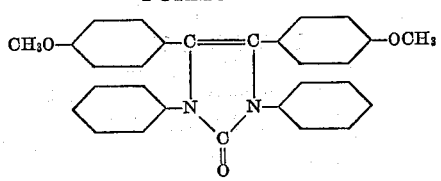
FORMULA 20
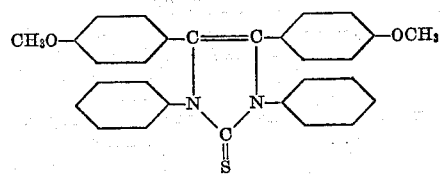
FORMULA 21
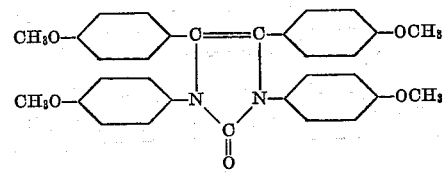
FORMULA 22
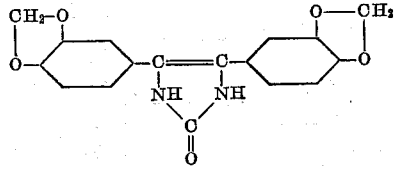
FORMULA 23
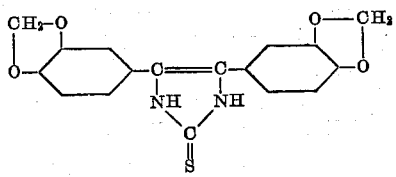
FORMULA 24
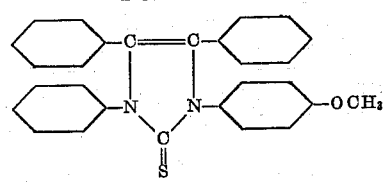

FORMULA 25
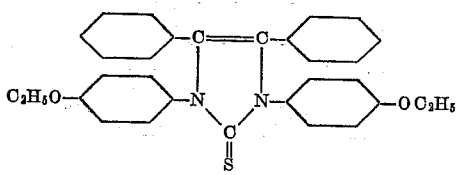

FORMULA 26
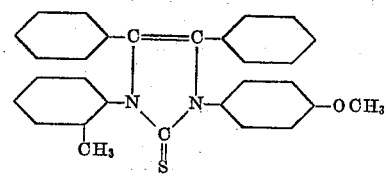

FORMULA 27
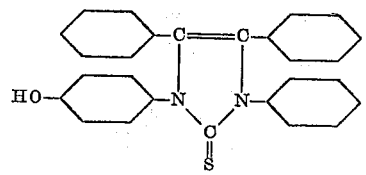

FORMULA 28
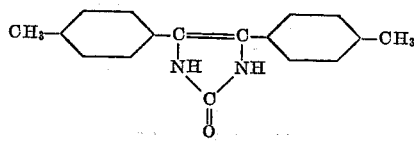

FORMULA 29
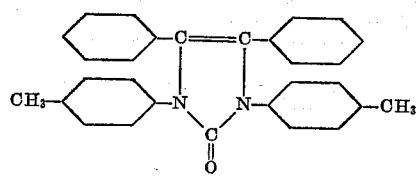

FORMULA 30
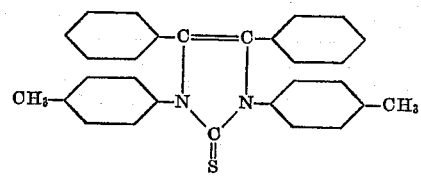

FORMULA 31
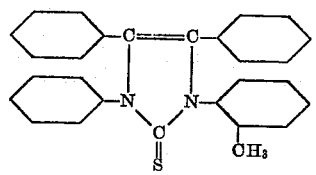

FORMULA 32
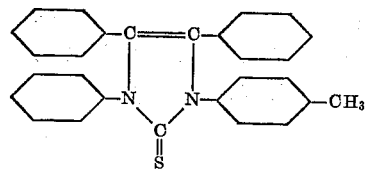

FORMULA 33
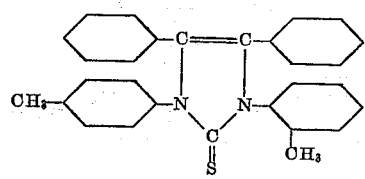

FORMULA 34
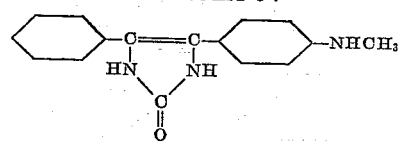

FORMULA 35
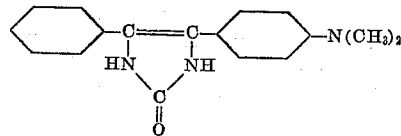

FORMULA 36
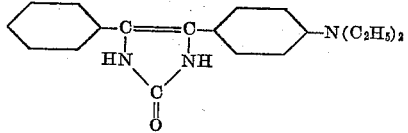

FORMULA 37
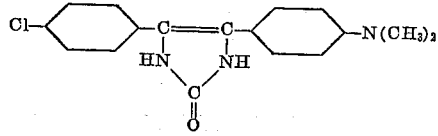

FORMULA 38
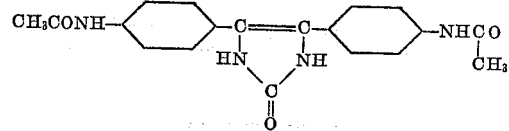

FORMULA 39
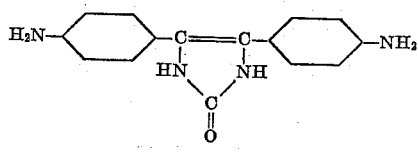

FORMULA 40
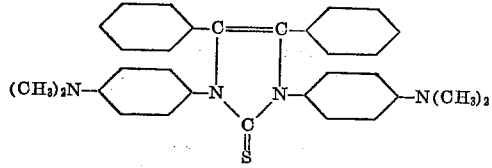

A number of these compounds have already been described in the literature. As far as the others are concerned, they are obtained by condensation of benzoin or of a benzoin in which one or both phenyl radicals are substituted by urea or by urea substituted in one or both of the two amino groups. Condensation takes place when the two reaction components are boiled for several hours in low-boiling fatty acids, e.g. glacial acetic acid. If thiourea or a correspondingly substituted thiourea is used as reaction component in the condensation process instead of urea, 4,5-diphenyl-imidozolidinethione-(2) substances are obtained in analogous reaction. The following table illustrates the starting materials used and the reaction conditions for the preparation of various of these compounds:

| Compound formula No. | Melting point | Preparation requirements ||||| Solvent for recrystallisation |
|---|---|---|---|---|---|---|
| | | Benzoin comp. | Urea comp. | Fatty acid | Boiling time hours | |
| 8 | 269–271° C | 32 g. 4,4'-dichlorobenzoin | 16 g. urea | 100 cc. glacial acetic acid | 5 | Glycolmonomethyl ether. |
| 9 | 270–271° C | 36 g. 3,3'-dichlorobenzoin | 14 g. urea | 55 cc. glacial acetic acid | 7 | Do. |
| 11 | 233° C | 4.24 g. benzoin | 5.35 g. N-(4-chlorophenyl)-N'-phenyl-thio-urea | 30 cc. glacial acetic acid | 6 | Ethanol 96%. |
| 12 | 220° C | 4.24 g. benzoin | 5.34 g. N-(2-chlorophenyl)-N'-phenylthiourea | do | 6 | Do. |
| 13 | 202° C | 4.24 g. benzoin | 5.35 g. N-(3-chlorophenyl)-N'-phenyl-thiourea | do | 6 | Benzene. |
| 14 | 206° C | 2.12 g. benzoin | 2.97 g. N,N'-bis-(4-chlorophenyl)-urea | 15 cc. glacial acetic acid | 6 | Do. |
| 15 | 127° C | 2.12 g. benzoin | 3.70 g. N,N'-bis-(3-bromophenyl)-urea | do | 6 | Ethanol 96%. |
| 16 | 245° C | 4.24 g. benzoin | 6.14 g. N-phenyl-N'-(4-bomo-phenyl)-thiourea | 30 cc. glacial acetic acid | 6 | Glacial acetic acid. |
| 17 | 276–277° C | 5 g. 4,4'-dimethoxybenzoin (anisoin). | 2.5 g. urea | 20 cc. propionic acid | 7 | Alcohol. |
| 18 | 228–229° C | 7 g. 3,4-dimethoxy-3'-chloro-benzoin. | 3 g. urea | 30 cc. propionic acid | 7 | Do. |
| 19 | 231° C | 5.44 g. 4,4'-dimethoxybenzoin. | 4.24 g. N,N'-diphenyl-urea | 30 cc. glacial acetic acid | 6 | Benzene/petroleum ether. |
| 20 | 222° C | 5.44 g. 4,4'-dimethoxybenzoin. | 4.56 g. N,N'-diphenyl-thiourea. | do | 8 | Do. |
| 21 | 256° C | 2.72 g. 4,4'-dimethoxybenzoin. | 2.72 g. N,N'-bis-(4-methoxyphenyl)-urea. | 15 cc. glacial acetic acid | 6 | Benzene. |
| 24 | 221° C | 4.24 g. benzoin | 5.16 g. N-phenyl-N'-(4-methoxyphenyl)-thiourea. | 30 cc. glacial acetic acid | 6 | Benzene/petroleum ether. |
| 25 | 230–240° C | do | 6.32 g. N,N'-bis-(4-ethoxyphenyl)-thio-urea. | do | 6 | Ethanol 96%. |
| 26 | 217° C | 4.28 g. benzoin | 5.44 g. N-(2-tolyl)-N'-(4-methoxy-phenyl)-thiourea. | do | 6 | Benzene/petroleum ether. |
| 27 | 315° C | 2.12 g. benzoin | 2.44 g. N-phenyl-N'-(4-hydroxy-phenyl)-thiourea. | 15 cc. glacial acetic acid | 6 | Ethanol 96%. |
| 28 | 273–274° C | 13 g. 4,4'-di-methyl-benzoin. | 6 g. urea | 20 cc. propionic acid | 4 | Alcohol. |
| 29 | 214° C | 4.24 g. benzoin | 4.80 g. N, N'-bis-(p-tolyl)-urea. | 30 cc. glacial acetic acid | 6 | Glacial acetic acid. |
| 30 | 233° C | do | 5.12 g. N,N'-bis-(p-tolyl)-thiourea. | do | 5 | Benzene. |
| 31 | 225° C | do | 4.84 g. N-phenyl-N'-(o-tolyl)-thiourea. | do | 6 | Benzene/petroleum ether. |
| 32 | 227° C | do | 4.84 g. N-phenyl-N'-(p-tolyl)-thiourea. | do | 6 | Do. |
| 33 | 189° C | do | 5.12 g. N-o-tolyl-N'-p-tolyl-thiourea. | do | 6 | Do. |
| 34 | 150° C. decomp. from. | 4.5 g. 4-methyl-amino-benzoin. | 2 g. urea | 15 cc. propionic acid | 6 | Alcohol. |
| 36 | 218–222° C | 10 g. p-diethyl-amino-benzoin. | 3.8 g. urea | 30 cc. glacial acetic acid | 7 | Methanol. |
| 37 | 262–264° C | 45 g. 4-dimethyl-amino-4'-chloro-benzoin. | 16 g. urea | 100 cc. glacial acetic acid. | 4 | Glycolmono-methyl ether. |
| 38 | 313–314° C | 30 g. 4,4'-bis-acet-amino benzoin. | 11 g. urea | 200 cc. glacial acetic acid. | 6 | Do. |
| 40 | 318° C | 4.24 g. benzoin | 6.28 g. N,N'-bis-(4-dimethylamino-phenyl)-thiourea. | 30 cc. glacial acetic acid | 5 | Glacial acetic acid. |

To further illustrate the process, some detailed examples may be used. For example, the compound of Formula 8 is obtained in the following manner:

32 g. of 4,4'-dichloro-benzoin are boiled under reflux with 16 g. of urea in 100 cc. of glacial acetic acid for five hours. The reaction product, 4,5-bis-(4'-chlorophenyl)-imidazolidinone-(2), crystallizes out during the boiling. The reaction mixture is poured hot into a beaker and is allowed to stand overnight. The liquid is then removed by suction while the crystals remaining behind are ground several times with ether, liquid being again removed by suction. They are then dissolved in boiling glacial acetic acid and, with stirring, introduced dropwise into water; after the stirring has been continued for half an hour, the liquid is separated by suction and the residue is washed in water, dried and recrystallized from glycolmonomethyl ether. Melting point 269–271° C.

The N-(o-tolyl)-N'-(p-methoxy-phenyl-thiourea required as the starting material for the preparation of the compound according to Formula 26 is prepared as follows: 12.4 g. of p-anisidine are dissolved in 15 cc. of benzene and 14.9 g. of o-tolyl mustard oil are added thereto. The mixture is heated for 15 minutes on the steam bath. As cooling takes place, N-(o-tolyl)-N'-(p-methoxy-phenyl)-thiourea precipitates out in colourless crystals. When recrystallized from benzene/petroleum-ether mixture, the compound melts at 140° C.

4-methylamino-benzoin, which is used as a reaction component in the preparation of the compound corresponding to Formula 34, is obtained when 12 g. of p-methylamino-benzaldehyde and 9.5 g. of benzaldehyde are dissolved in 45 cc. of alcohol; a solution of 3 g. of potassium cyanide in 18 cc. of water is added thereto and the reaction mixture is boiled for three hours under reflux. The reaction mixture is then allowed to stand overnight and is diluted with water. An orange-coloured oil separates out which, after a little shaking, solidifies. After repeated recrystallization from alcohol, the 4-methyl-amino-benzoin is obtained. This compound melts at 140–141° C.

The compound corresponding to Formula 39—4,5-bis-(4'-amino - phenyl) - imidazolidinone - (2)—is prepared from 4,5-bis-(4'-acetamino-phenyl)-imidazolidinone-(2), corresponding to Formula 38, in the following manner: 24.5 g. of the compound corresponding to Formula 38 are boiled with 300 cc. of 20% hydrochloric acid for half an hour. At first solution occurs. Later, particularly as cooling takes place, the hydrochloride separates out. It is removed and washed in water. The free base is precipitated by the addition to the solution of sodium bicarbonate. It is recrystallized from alcohol. Even after repeated recrystallization the compound does not show a sharp melting point but begins to decompose at 250° C.

*Example 1*

A solution containing 2 g. of the compound corresponding to Formula 22 to 30 cc. of glycolmonomethyl ether is applied to the surface of a paper foil, the surface having been pretreated against the penetration of organic solvents and then dried. On this paper, direct images are produced by the electrophotographic process in the following manner: The paper is either positively or negatively charged by a corona discharge, then exposed under a positive master to a high-pressure mercury lamp and dusted over with a resin powder coloured with carbon-black. The finely divided resin adheres to the parts of the coating not struck by light and a positive image appears which is slightly heated and thus made permanent (fixed). It has good contrast effect as the ground is brightened by the substances applied to the paper.

If instead of paper as in the above example a suitable transparent plastic foil or transparent paper is used as support for the photoelectric layer, the images produced are suitable as master-copies for duplication processes by means of any sort of light-sensitive sheets.

*Example 2*

A solution containing 1 g. of the compound corresponding to Formula 20 and 1 g. of ketone resin, e.g. the Kunstharz EM marketed by Messrs. Rheinpreussen G.m.b.H., Homberg am Niederrhein, in 30 cc. of glycolmonomethyl ether, is applied to an aluminum foil. After evaporation of the solvent the layer applied adheres firmly to the surface of the aluminum. With this coated aluminum foil, electrophotographic images can be produced as described in Example 1. If a sheet of paper is laid upon the unfixed image in carbon black-resin powder and charging by corona discharge is renewed, the carbon black-resin image is transferred from the aluminum foil to the paper, a mirro-image being produced thereon. If the carbon black-resin image is transferred to transparent paper or to transparent plastic foil, the image obtained can be further copied, for example, on diazo photoprinting paper.

*Example 3*

A solution containing 1 g. of the compound corresponding to Formula 30 and 1 g. of coumarone resin, for example, the type available as 701/85 from the Gesellschaft für Teerverwertung, Duisburg-Meiderich, to 30 cc. of benzene, is applied to a paper foil, the surface of which has been pretreated against penetration of organic solvents and then dried. On this paper, direct images are produced by the electrophotographic process as described in Example 1.

*Example 4*

1 g. of the compound corresponding to Formula 16 and 1 g. of resin-modified maleic acid resin, e.g. that marketed by Reichhold Chemie A.G., Hamburg, under the registered trademark "Beckacite" K 105, are dissolved in 30 cc. of benzene. This solution is applied to a non-transparent, but light-permeable paper and the coated paper is dried. After drying, it is electrically charged by means of a corona discharge; it is then placed with its coated side against a double-sided printed sheet which has been backed with black paper and it is exposed for four sceconds to the light of a 100-watt incandescent bulb. Exposure thus takes place through the non-transparent but light-permeable paper. After exposure the reflex image is dusted over with a resin powder coloured with carbon black. A positive mirror-image, rich in contrast, is obtained. If paper or a plastic foil is pressed firmly against the image obtained, the image is transferred and a correct image is produced on the paper or foil. In the preparation of the correct image an electric field can be applied in manner known per se to the paper or foil which is to receive the correct image. If the paper or foil is transparent, intermediate originals are obtained for further reproduction, for example, on photoprinting paper.

*Example 5*

0.5 g. each of the compound corresponding to Formula 32 and that corresponding to Formula 20 are each dissolved in 15 cc. of a mixture of benzene and glycolmonomethylether and the solutions are mixed. This solution is applied to a paper foil of the same type as that used in Example 1 and dried. The coated paper foil is then further processed for the production of an image as described in Example 1. A positive image is obtained from a positive master.

*Example 6*

1 g. of the compound corresponding to Formula 11, 1 g. of ketone resin, e.g. the Kunstharz EM mentioned in Example 2, and 0.01 g. of acid violet 6 BN (Schultz, "Farbstofftabellen," 7th edition, 1st vol. (1931), No. 831) are dissolved in 30 cc. of glycolmonoethylether and the resulting light-blue solution is applied to paper and dried. After being charged by means of a corona discharge the now sensitized paper is exposed under a transparent positive master to the light of a 100-watt incandescent bulb and dusted over with a resin powder coloured with carbon black. A positive image is obtained which is fixed by heating. After fixing, images rich in contrast and free from background on light-blue ground are obtained.

*Example 7*

1 g. of the compound corresponding to Formula 36 and 1 g. of ketone resin, e.g. the Kunstharz EM mentioned in Example 2 are dissolved in 30 cc. of glycolmonomethylether and the solution is applied to paper and dried. For the preparation of an image with the paper foil thus coated the procedure is as described in Example 1. A positive image rich in contrast is obtained from a transparent positive master. Very brief exposure is sufficient for a good image rich in contrast.

*Example 8*

1 g. of the compound corresponding to Formula 39, 1 g. of a polymerized natural resin, e.g. the resin produced by the American firm Hercules Powder Company, Wilmington, and marketed under the trade name "Poly Pale," 0.01 g. of Eosin A (Schultz "Farbstofftabellen," 7th edition, 1st vol. (1931), No. 881) and 0.01 g. of Victoria Blue B (Schultz "Farbstofftabellen," 7th edition, 1st vol. (1931), No. 822) are dissolved in 30 cc. of glycolmonomethylether and the solution is applied to paper and dried. With paper foil thus coated, electrophotographic images can be produced as described in Example 1. Good images on blue ground are obtained.

*Example 9*

1 g. of the compound corresponding to Formula 35, 1 g. of ketone resin, e.g. the Kunstharz SK marketed by Chemische Werke Hüls A.G., Marl, and 0.01 g. of rhodamine B (Schultz "Farbstofftabellen," 7th edition, 1st vol. (1931), No. 864) are dissolved in 30 cc. of glycolmonomethylether and the solution is applied to paper as in Example 1. After being charged by means of a corona discharge the now sensitized paper is exposed briefly under a transparent positive master to the light of a 100-watt incandescent bulb and dusted over with a resin powder coloured with carbon black. A positive image is produced which is fixed by brief heating. After fixing there are good images on pale reddish-yellow ground.

*Example 10*

0.5 g. of the compound corresponding to Formula 39, 0.5 g. of 2,5-bis-[4'-diethyl-aminophenyl-(1')]-1,3,4-oxadiazole and 1 g. of ketone resin, e.g. the Kunstharz AP marketed by the Chemische Werke Hüls, are dissolved in 30 cc. of glycolmonomethylether and the solution is applied to paper and dried. With the coated paper electrophotographic images are produced as described in Example 1. Good images on pale yellow ground are produced.

*Example 11*

0.5 g. of the compound corresponding to Formula 9, 0.5 g. of 2,5-bis-[4'-diethyl-amino-phenyl-(1')]-1,3,4-triazole and 0.02 g. of rhodamine B extra (Schultz "Farbstofftabellen," 7th edition, 1st vol. (1931), No. 864) are dissolved in 30 cc. of glycolmonomethylether and the solution is applied to paper as described in Example 1. After being charged by means of a corona discharge, the sensitized paper is exposed under a transparent positive master to a 25-watt incandescent lamp and dusted over with a resin powder coloured with carbon black. A positive image is produced that is fixed by heating. Good images on pink ground are obtained.

*Example 12*

1 g. of the compound corresponding to Formula 28 and 1 g. of ketone resin, e.g., the Kunstharz AP mentioned in Example 10 are dissolved in 30 cc. of glycomonomethylether and the solution is applied to a superficially roughened aluminum foil. After evaporation of the solvent the coating remaining adheres firmly to the surface of the foil. For the production of an image the procedure is as described in Example 1 and if a transparent positive master is used a positive image is obtained which is likewise fixed as described in Example 1. This image can be made into a positive printing plate if the aluminum foil is wiped over on the image-bearing side with a developer consisting of glycolmonomethylether and 1.5% phosphoric acid in the proportion of 4:1, rinsed with water and inked up with greasy ink and 0.5% phosphoric acid.

The resin powder used for dusting in the above examples may be obtained by fusing 30 parts by weight of polystyrene (K-Wert 55) and 30 parts by weight of a maleic acid resin modified with resins sold under the trade name "Beckacite K 105." This resin powder is mixed with 3 parts by weight of the carbon black. The mixture of resin powder and carbon black is used in combination with iron filings or glass beads or other substances as developer for the latent electrostatic image.

Unless otherwise specified, wherever the term "alcohol" is used it preferably refers to ethyl alcohol.

We claim:

1. An electrophotographic reproduction material comprising a conductive support layer and a photoconductive insulating layer, the latter comprising a compound having the formula

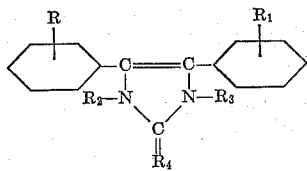

in which R and $R_1$ are selected from the group consisting of hydrogen, halogen, alkoxy, alkyl, and amino radicals, and an organic linkage forming a fused heterocyclic ring, $R_2$ and $R_3$ are selected from the group consisting of hydrogen alkyl, and phenyl groups containing no strongly negative substituents, and $R_4$ is selected from the group consisting of oxygen and sulfur.

2. An electrophotographic material according to claim 1 in which the photoconductive layer contains a dyestuff sensitizer.

3. An electrophotographic material according to claim 1 in which the photoconductive layer contains an organic colloid.

4. An electrophotographic reproduction material comprising a conductive support layer and a photoconductive insulating layer, the latter comprising a compound having the formula

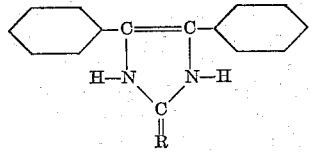

in which R is selected from the group consisting of oxygen and sulfur.

5. An electrophotographic reproduction material comprising a conductive support layer and a photoconductive insulating layer, the latter comprising a compound having the formula

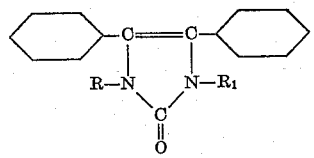

in which R and $R_1$ are alkyl radicals.

6. An electrophotographic reproduction material comprising a conductive support layer and a photoconductive insulating layer, the latter comprising a compound having the formula

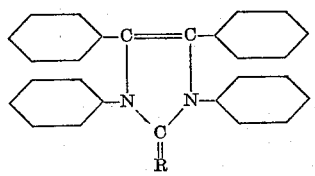

in which R is selected from the group consisting of oxygen and sulfur.

7. An electrophotographic reproduction material comprising a conductive support layer and a photoconductive insulating layer, the latter comprising a compound having the formula

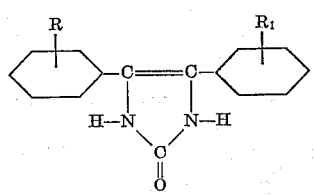

in which R and $R_1$ are halogen.

8. An electrophotographic reproduction material comprising a conductive support layer and a photoconductive insulating layer, the latter comprising a compound having the formula

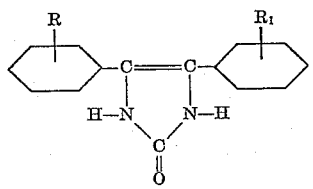

in which R and $R_1$ are alkoxy radicals.

9. An electrophotographic reproduction material comprising a conductive support layer and a photoconductive insulating layer, the latter comprising a compound having the formula

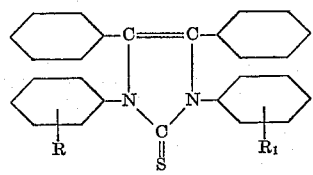

in which R and $R_1$ are alkoxy radicals.

10. An electrophotographic reproduction material comprising a conductive support layer and a photoconductive insulating layer, the latter comprising a compound having the formula

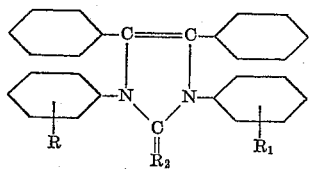

in which R and $R_1$ are alkyl radicals and $R_2$ is selected from the group consisting of oxygen and sulfur.

11. An electrophotographic reproduction material comprising a conductive support layer and a photoconductive insulating layer, the latter comprising a compound having the formula

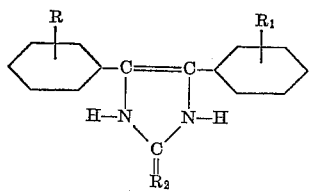

in which R and $R_1$ are amino radicals and $R_2$ is selected from the group consisting of oxygen and sulfur.

12. An electrophotographic reproduction material comprising a conductive support layer and a photoconductive insulating layer, the latter comprising a compound having the formula

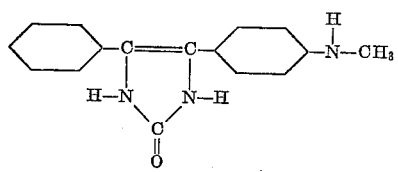

13. An electrophotographic reproduction material comprising a conductive support layer and a photoconductive insulating layer, the latter comprising a compound having the formula

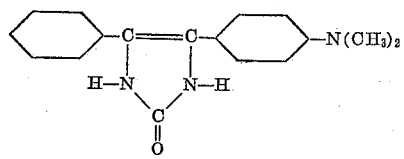

14. An electrophotographic reproduction material comprising a conductive support layer and a photoconductive insulating layer, the latter comprising a compound having the formula

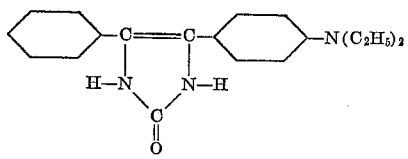

15. An electrophotographic reproduction material comprising a conductive support layer and a photoconductive insulating layer, the latter comprising a compound having the formula

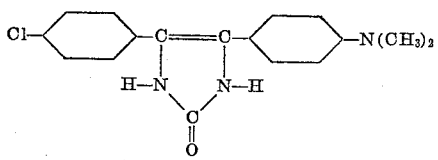

16. An electrophotographic reproduction material comprising a conductive support layer and a photoconductive insulating layer, the latter comprising a compound having the formula

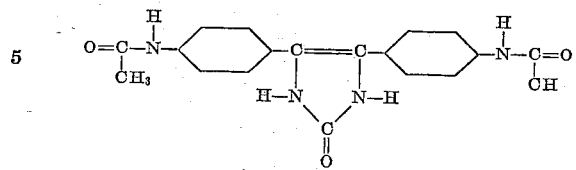

17. An electrophotographic reproduction material comprising a conductive support layer and a photoconductive insulating layer, the latter comprising a compound having the formula

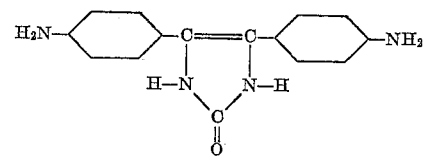

18. An electrophotographic reproduction material comprising a conductive support layer and a photoconductive insulating layer, the latter comprising a compound having the formula

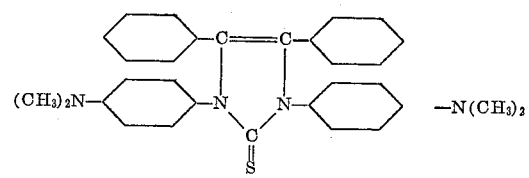

19. An electrophotographic reproduction material comprising a conductive support layer and a photoconductive insulating layer, the latter comprising a compound having the formula

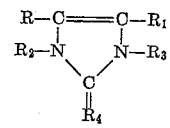

in which R and $R_1$ are phenyl groups containing no strongly negative substituents, $R_2$ and $R_3$ are selected from the group consisting of hydrogen, alkyl, and phenyl groups containing no strongly negative substituents, and $R_4$ is selected from the group consisting of oxygen and sulfur.

20. An electrophotographic reproduction process which comprises exposing an electrically charged photoconductive insulating layer on a conductive support layer to light under a master and developing the resulting image with an electroscopic material, the photoconductive insulating layer comprising a compound having the formula

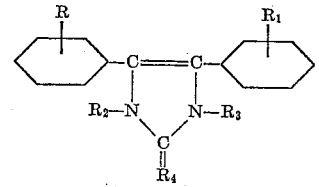

in which R and $R_1$ are selected from the group consisting of hydrogen, halogen, alkoxy, alkyl, and amino radicals, and an organic linkage forming a fused heterocyclic ring, $R_2$ and $R_3$ are selected from the group consisting of hydrogen, alkyl, and phenyl groups containing no strongly negative substituents, and $R_4$ is selected from the group consisting of oxygen and sulfur.

21. A process according to claim 20 in which the photoconductive layer contains a dyestuff sensitizer.

22. A process according to claim 20 in which the photoconductive layer contains an organic colloid.

23. An electrophotographic reproduction process which comprises exposing an electrically charged photoconductive insulating layer on a conductive support layer to light under a master and developing the resulting image with an electroscopic material, the photoconductive insulating layer comprising a compound having the formula

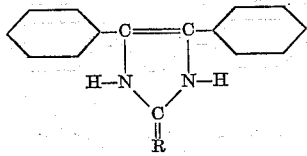

in which R is selected from the group consisting of oxygen and sulfur.

24. An electrophotographic reproduction process which comprises exposing an electrically charged photoconductive insulating layer on a conductive support layer to light under a master and developing the resulting image with an electroscopic material, the photoconductive insulating layer comprising a compound having the formula

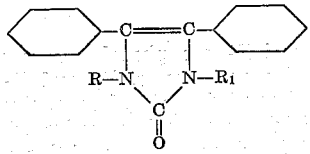

in which R and $R_1$ are alkyl radicals.

25. An electrophotographic reproduction process which comprises exposing an electrically charged photoconductive insulating layer on a conductive support layer to light under a master and developing the resulting image with an electroscopic material, the photoconductive insulating layer comprising a compound having the formula

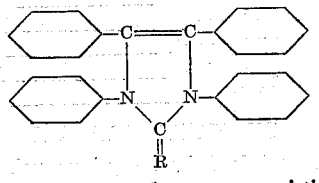

in which R is selected from the group consisting of oxygen and sulfur.

26. An electrophotographic reproduction process which comprises exposing an electrically charged photoconductive insulating layer on a conductive support layer to light under a master and developing the resulting image with an electroscopic material, the photoconductive insulating layer comprising a compound having the formula

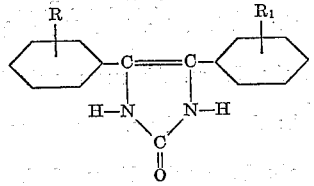

in which R and $R_1$ are halogen.

27. An electrophotographic reproduction process which comprises exposing an electrically charged photoconductive insulating layer on a conductive support layer to light under a master and developing the resulting image with an electroscopic material, the photoconductive insulating layer comprising a compound having the formula

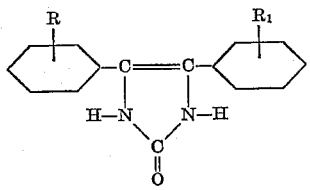

in which R and $R_1$ are alkoxy radicals.

28. An electrophotographic reproduction process which comprises exposing an electrically charged photoconductive insulating layer on a conductive support layer to light under a master and developing the resulting image with an electroscopic material, the photoconductive insulating layer comprising a compound having the formula

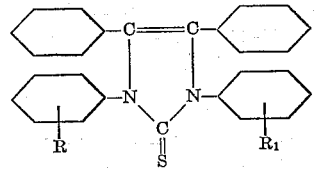

in which R and $R_1$ are alkoxy radicals.

29. An electrophotographic reproduction process which comprises exposing an electrically charged photoconductive insulating layer on a conductive support layer to light under a master and developing the resulting image with an electroscopic material, the photoconductive insulating layer comprising a compound having the formula

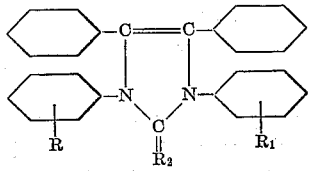

in which R and $R_1$ are alkyl radicals and $R_2$ is selected from the group consisting of oxygen and sulfur.

30. An electrophotographic reproduction process which comprises exposing an electrically charged photoconductive insulating layer on a conductive support layer to light under a master and developing the resulting image with an electroscopic material, the photoconductive insulating layer comprising a compound having the formula

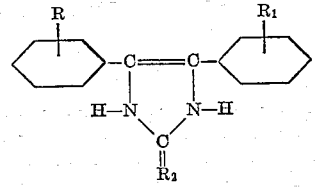

in which R and $R_1$ are amino radicals and $R_2$ is selected from the group consisting of oxygen and sulfur.

31. An electrophotographic reproduction process which comprises exposing an electrically charged photoconductive insulating layer on a conductive support layer to light under a master and developing the resulting image with an electroscopic material, the photoconductive insulating layer comprising a compound having the formula

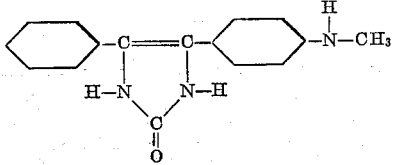

32. An electrophotographic reproduction process which comprises exposing an electrically charged photoconductive insulating layer on a conductive support layer to light under a master and developing the resulting image with an electroscopic material, the photoconductive insulating layer comprising a compound having the formula

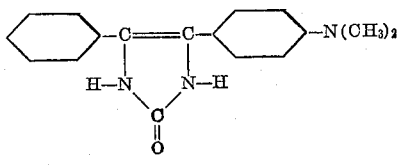

33. An electrophotographic reproduction process which comprises exposing an electrically charged photoconductive insulating layer on a conductive support layer to light under a master and developing the resulting image with an electroscopic material, the photoconductive insulating layer comprising a compound having the formula

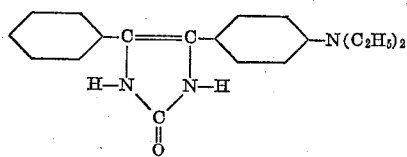

34. An electrophotographic reproduction process which comprises exposing an electrically charged photoconductive insulating layer on a conductive support layer to light under a master and developing the resulting image with an electroscopic material, the photoconductive insulating layer comprising a compound having the formula

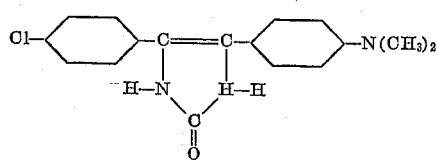

35. An electrophotographic reproduction process which comprises exposing an electrically charged photoconductive insulating layer on a conductive support layer to light under a master and developing the resulting image with an electroscopic material, the photoconductive insulating layer comprising a compound having the formula

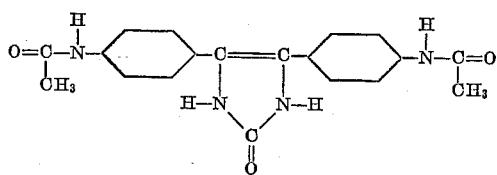

36. An electrophotographic reproduction process which comprises exposing an electrically charged photoconductive insulating layer on a conductive support layer to light under a master and developing the resulting image with an electroscopic material, the photoconductive insulating layer comprising a compound having the formula

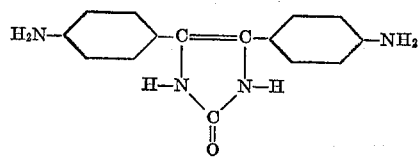

37. An electrophotographic reproduction process which comprises exposing an electrically charged photoconductive insulating layer on a conductive support layer to light under a master and developing the resulting image with an electroscopic material, the photoconductive insulating layer comprising a compound having the formula

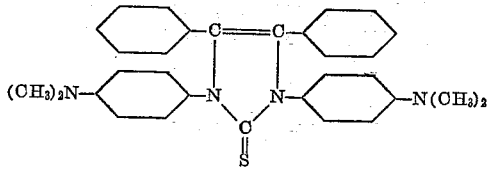

38. An electrophotographic reproduction process which comprises exposing an electrically charged photoconductive insulating layer on a conductive support layer to light under a master and developing the resulting image with an electroscopic material, the photoconductive insulating layer comprising a compound having the formula

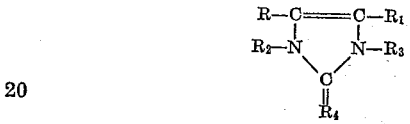

in which $R$ and $R_1$ are phenyl groups containing no strongly negative substituents, $R_2$ and $R_3$ are selected from the group consisting of hydrogen, alkyl, and phenyl groups containing no strongly negative substituents, and $R_4$ is selected from the group consisting of oxygen and sulfur.

References Cited in the file of this patent

UNITED STATES PATENTS

| | | |
|---|---|---|
| 2,297,691 | Carlson | Oct. 6, 1942 |
| 2,663,636 | Middleton | Dec. 22, 1953 |
| 2,692,178 | Grandadam | Oct. 19, 1954 |
| 2,709,702 | Williams | May 31, 1955 |
| 2,723,197 | Libby et al. | Nov. 8, 1955 |
| 2,800,559 | Ubbelohde | July 23, 1957 |
| 2,825,814 | Walkup | Mar. 4, 1958 |

OTHER REFERENCES

Pastak: Journal de Chimie Physique, vol. 26, pp. 65–68 (1929).

Petrikaln: Zeitschrift für Physikalische Chemie, vol. 10(B), pp. 9–21 (1930).

Putseiko: Doklady Akad. Nauk SSSR, vol. 59, pp. 471–474.

Wainer: Photographic Engineering, vol. 3, No. 1, pp. 12–22; abstracted in Chem. Abstracts, vol. 43, p. 1275 (1949).

Novelli: Chem. Abstracts, vol. 47, p. 9321 (1953).

Young et al.: R.C.A. Review, December 1954, pp. 469–48.

Yoshida et al.: Chem. Abstracts, vol. 48, pp. 2690–2691 (1954).

Lyons et al.: Journ. Chem. Soc., August 1957, pp. 3648–3668.

Drefahl et al.: Z. Physik Chem., 206, p. 93 (1956) (C.A. 51, 6329e).